Sept. 16, 1952

FREDERICK K. MAUSSNEST
NOW BY CHANGE OF NAME
FREDERICK K. MAUST
COUNTERBALANCING DEVICE 2,610,524

Filed June 23, 1948

5 Sheets-Sheet 1

INVENTOR.
Frederick K. Maussnest
NOW BY CHANGE OF NAME
FREDERICK K. MAUST

INVENTOR.
Frederick K. Maussnest
NOW BY CHANGE OF NAME
FREDERICK K. MAUST

Sept. 16, 1952

FREDERICK K. MAUSSNEST
NOW BY CHANGE OF NAME
FREDERICK K. MAUST 2,610,524

COUNTERBALANCING DEVICE

Filed June 23, 1948

5 Sheets-Sheet 3

INVENTOR.

Frederick K. Maussnest
NOW BY CHANGE OF NAME
FREDERICK K. MAUST

INVENTOR.

Frederick K. Maussnest

NOW BY CHANGE OF NAME
FREDERICK K. MAUST

Sept. 16, 1952 | FREDERICK K. MAUSSNEST NOW BY CHANGE OF NAME FREDERICK K. MAUST | 2,610,524

COUNTERBALANCING DEVICE

Filed June 23, 1948 | 5 Sheets-Sheet 5

INVENTOR.

Frederick K. Maussnest

Now By Change of Name

Frederick K. Maust

Patented Sept. 16, 1952

2,610,524

UNITED STATES PATENT OFFICE 2,610,524

COUNTERBALANCING DEVICE

Frederick K. Maussnest, Queens Village, N. Y., now by change of name Frederick K. Maust Application June 23, 1948, Serial No. 34,645

4 Claims. (Cl. 74—603)

This invention relates in general to balancing devices for completely counterbalancing crank actuated reciprocating mechanisms, i. e., mechanisms for changing a substantially uniform rotary motion into a reciprocating motion, or vice versa, and more particularly to balancing means for punch presses of all kinds which employ driveshafts with crankarms or crankpins, or driveshafts carrying eccentrics or eccentrics mounted on bull gears, herein simply called crankshafts, in combination with connecting rods or sliding blocks for reciprocating their working heads or slides.

The term "punch press" is used hereinafter in its broadest sense and includes any and all mechanical presses whose slide or slides are reciprocated by crankshafts with single cranks or multiple cranks or eccentrics, defined in this art as single crank presses, double crank presses, multiple slide presses, four point suspension presses, etc.

Mechanical punch presses are nearly exclusively built on the above described crank principle because of the many advantages of construction and simplicity of design. Crank motions of this type are, however, unfortunately inherently unbalanced.

High speed operation of punch presses, and especially of punch presses with automatic feeds capable of utilizing practically every working stroke of the machine, has been the aim of the metal working and stamping arts for many years. Solutions have been offered heretofore which consisted in either different actuating motions for the slides, or in arranging dummy slides which reciprocate in opposite direction to the working slides without doing any useful work. The cost of construction of such equipment compared with conventional presses of similar tonnage capacity appears out of proportion compared with the results obtained.

The unbalanced forces encountered in the operation of a reciprocating crank mechanism or kinematically equivalent system, such as a punch press, may be conveniently divided into three distinct classes.

1st: The unbalanced rotational inertia forces caused by the rotating crankarm or crankpin including those associated elements which may be considered as partaking of its rotary motion. These rotational inertia forces may be neutralized by masses attached to the crankshaft diametrically opposite the crankpin at a radius that depends on the magnitude of the mass attached.

2nd: The primary and secondary inertia forces caused by the reciprocating slide with its associated elements. These forces will be called in short "primary" and "secondary" inertia forces. While the reciprocating inertia forces of such crank actuated reciprocating systems which employ pitmans have theoretically an infinite number of harmonics of even number, only the first and second harmonics will be considered here, because they represent very nearly the true slide motion. The frequency of the harmonic fixes the rate of rotation, the first harmonic having crankshaft speed, the second harmonic having twice crankshaft speed. The secondary inertia forces already are of comparatively small magnitude, i. e. equal to the primary inertia forces divided by the ratio of connecting rod length over the crank radius. This ratio is usually on the order of about 10:1 to 15:1 in punch presses. These figures are not given in any limiting sense, but only to make visualization of the relative forces easier.

The slide motion of presses which employ a sliding block surrounding an eccentric is a simple harmonic, because the connecting rod of finite length is eliminated. The total inertia forces of the reciprocating mass are therefore simply the primary inertia forces.

3rd: In addition to the dynamic inertia forces which appear as a result of the motion of the machine, the static weight of the reciprocating slide assembly exerts a steady and constant downward force in a vertically placed crank mechanism of this character.

To obtain complete balance, all inertia forces and the static weight of the slide assembly must be counterbalanced by equal and opposite forces. Otherwise the unbalanced forces will act on the crankshaft and consequently on the main bearings of the machine, thereby increasing the bearing load and setting up forced vibrations. The latter not only limit the speed of operation, but must be absorbed by the main frame or foundation.

The balancing of the rotational inertia forces by attaching counterweights to the crankshaft has found little application in punch presses because of space limitations and particularly for the reason that this method alone accomplishes at best only a partial solution to the existing vibration problems. Therefore, the usual extent of counterbalancing the unbalanced static and dynamic forces in presses has been heretofore restricted to single or compound springs or air cushions. It is obvious that simple harmonics with different frequencies cannot be counterbalanced effectively in this manner because the force created by compressing a spring, for instance, is a linear function of the distance of compression.

The present invention not only modifies the inertia forces of the reciprocating masses but provides for their complete counterbalancing by means of compact and comparatively inexpensive balancing means. The novel balancing means may be employed in conjunction with conventional punch presses with little or no change in their present design. I accomplish the balancing effect by the provision of a plurality of novelly arranged and actuated rotating counterweights which act in opposition to the rotational and reciprocating inertia forces, respectively, and by air cushions or springs for neutralizing the static weights, as will be fully shown and described hereinafter.

More specifically, one object of my invention is to provide balancing means for reciprocating crank systems of the character described for neutralizing the rotational and the primary inertia forces by employing two or more counterweights which revolve synchronously with the drive shaft or crankshaft, at least one of said counterweights being adapted to revolve in the same direction and at the same speed as the crankshaft, and at least one other counterweight being adapted to revolve at the same speed but in opposite direction to the crankshaft.

Another object is to provide the just mentioned balancing means with additional counterweighting means adapted to rotate at twice crankshaft speed for also neutralizing the secondary inertia forces.

A further object is to provide compact, self-contained balancing units which may be conveniently attached singly or in multiples to punch presses or other equipment to be balanced and in which bevel gearing is employed for imparting the proposed directions and speeds to the counterweighting means.

Another object is to provide novelly arranged air cushions and/or springs in conjunction with punch presses for off-setting the static weight of the slide assembly.

These and other objects and advantages will become better understood as the following description of certain present preferred embodiments proceeds. In the accompanying drawings I have shown by way of example said present preferred embodiments, in which Fig. 1 is a right hand side view along line 1—1 of the balancing unit shown in Fig. 7 (press frame and mounting bolts not shown) for off-setting rotational as well as primary inertia forces.

Figure 22:
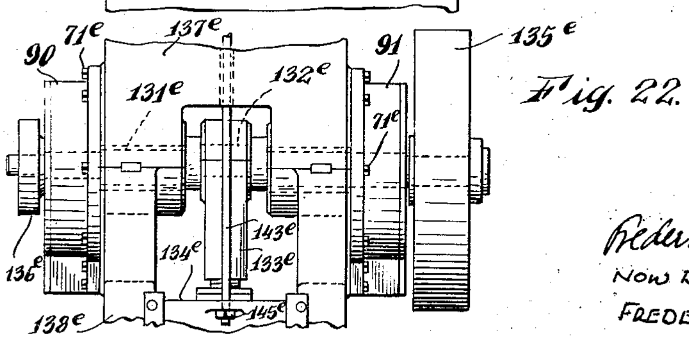

Fig. 22 also depicts a partial front view of a single crank press with twin balancing units on the outside of the press frame.

Figs. 23, 24, 25, and 26 show diagrammatically the relative positions of the rotating counterweights for neutralizing the primary and the secondary inertia forces with the crankshaft in the 0°, 90°, 180°, and 270° positions, respectively.

Figures 15, 23, 24, 25, 26:
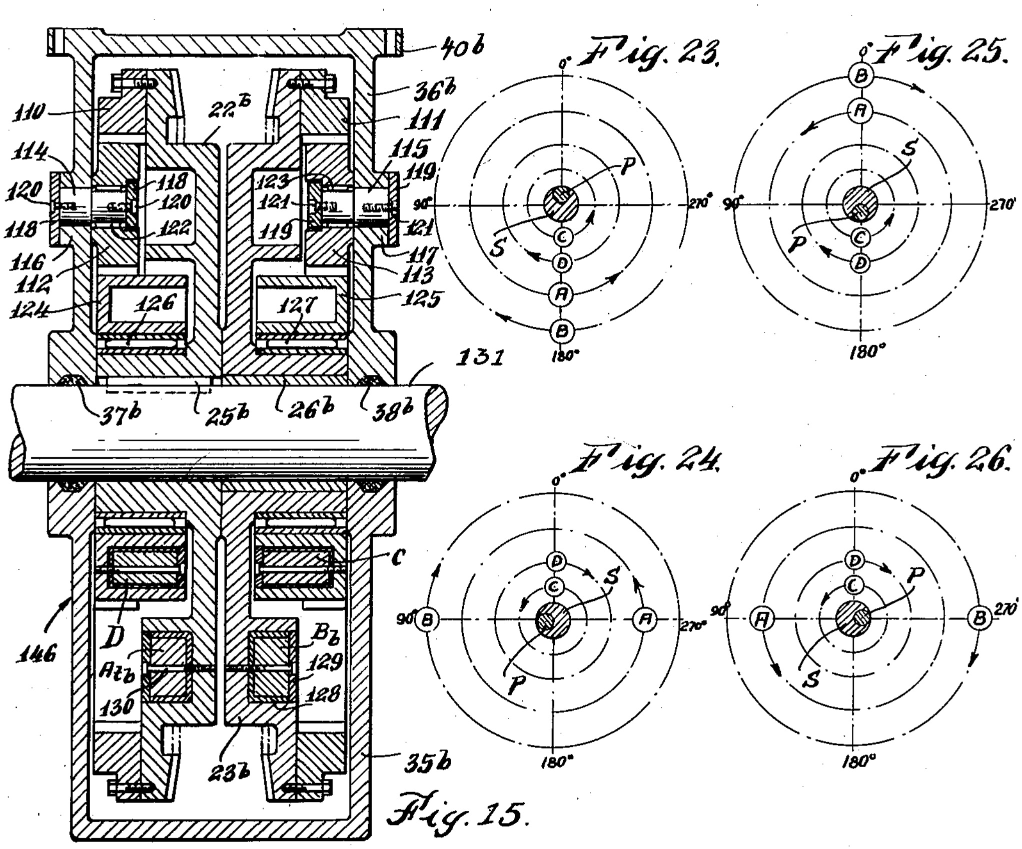
Fig. 15 is a vertical cross-section through the balancing unit along line 15—15 of Fig. 18, press frame and mounting bolts not shown.

Referring now more particularly to the drawings, the relative positions of the counterweights for neutralizing the primary and secondary inertia forces are shown diagrammatically in Figs. 23 to 26. In Fig. 23 the crankpin or crankarm P is at top dead center which is designated as the 0° position. The crankshaft S is assumed to be rotating in counterclockwise direction. The counterweight or mass A rotates in the same direction and at the same speed as the crankshaft S and is located diametrically opposite the crankpin P, i. e. at bottom dead center at this instant. Counterweight B rotates in opposite direction to crankshaft S but at the same speed and is coincident in this crank position with weight A at bottom dead center. These two counterweighting masses A and B, rotating at crankshaft speed but in respective opposite directions, will completely neutralize, oppose or counterbalance the primary inertia forces, provided their radii of rotation and their respective masses are so chosen that each one of the counterweights A and B off-sets substantially one-half of the primary inertia forces to be counterbalanced.

It should be noted in this connection that mass A is located opposite the crankpin P so that a counterweight for neutralizing the rotational inertia forces may be conveniently combined therewith, if desirable.

The counterweight C rotates in the same direction as the crankshaft S but at twice its speed. Counterweight D rotates in opposite direction to the crankshaft and also at twice its speed. Counterweighting masses A, B, C, and D act vertically downwards with no horizontal force components and are coincident at bottom dead center in the 0° position of crankpin P. The radii of rotation and the masses of counterweights C and D are preferably so chosen that each mass neutralizes substantially one-half of the secondary inertia forces to be counterbalanced.

Fig. 24 depicts the crankshaft S after having made one quarter of one revolution, having thus arrived at the 90° position. Counterweights A and B also have advanced 90° in their respective directions of rotation and have arrived at the 270° and 90° positions, respectively. Their centrifugal forces have no vertical components and act horizontally in opposite directions, thus cancelling each other. Masses C and D are in the 0° position and act vertically upwards without horizontal components.

Fig. 25 shows the crankshaft at bottom dead center (180°) position. Counterweights A and B are at top dead center and their centrifugal forces act vertically upwards with no horizontal components. Masses C and D are at bottom dead center; their forces act vertically downwards with no horizontal components.

Fig. 26 illustrates the positions of the several counterweights with the crankshaft in the 270° position. The masses A and B act in horizontal, but opposite directions and therefore cancel each other. They have no vertical force components. Counterweights C and D have arrived at top dead center and exert vertical upward forces without horizontal components.

After another quarter revolution, the crankshaft and counterweights assume again their original positions shown in Fig. 23 and the cycle repeats itself.

During one complete revolution of the crankpin P, all balancing weights are coincident at bottom dead center when the crankpin P is at top dead center; masses A and B are coincident at top dead center with the crankpin at bottom dead center; counterweights C and D are coincident at top dead center with the crankpin in the 90° and 270° positions; masses C and D are also coincident at bottom dead center when crankpin P is at bottom dead center.

While the positions of the several counterweights have been shown for full quarter revolutions of the crankshaft only, it will be obvious from the diagrams that the symmetrically arranged counterrotating pairs of masses A, B and C, D will introduce no unbalanced horizontal centrifugal force components in any crank positions, but will produce, when the masses and their radii of rotation are chosen as previously indicated, counterbalancing or off-setting centrifugal forces of their own of such magnitudes and directions as to oppose and thus eliminate the harmful primary and secondary inertia forces of reciprocating crank systems. Means will be described hereinafter to actuate the several counterweights at the speeds and in the directions diagrammatically indicated in Figs. 23 to 26 in positive synchronism with the crankshaft rotation. Consequently, a perface balance may be accomplished at any operating speed, because it is axiomatic that if the mechanism is brought into balance at one speed, it will also be in balance at any other speed.

Figure 1:
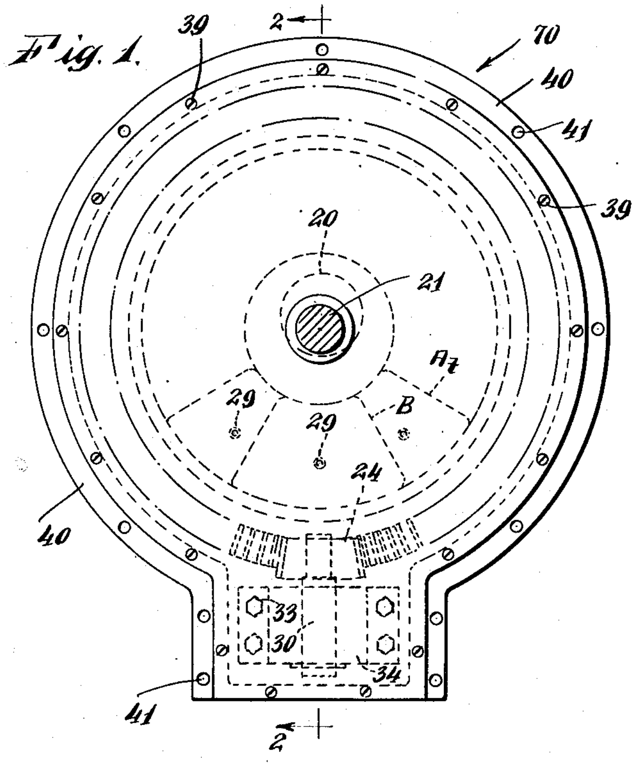
Figure 2:
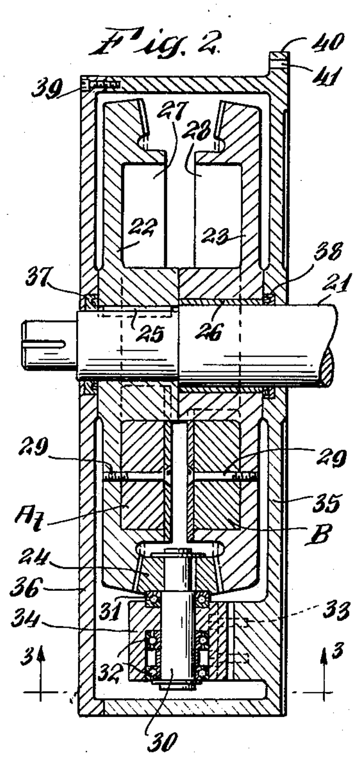
Fig. 2 is a section along line 2—2 in Fig. 1.
Figure 3:
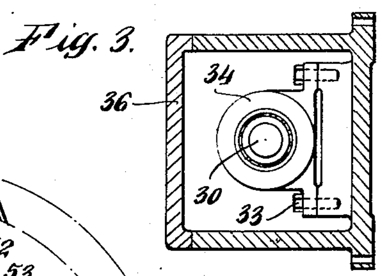
Fig. 3 shows a partial end view taken along line 3—3 of Fig. 2 and is intended to depict specifically the bearing bracket for the pinion shaft.

Figs. 1 to 3 show a balancing apparatus for opposing the rotational inertia forces and the primary inertia forces. The unit may be mounted directly on a crankshaft 21 which may be in top dead center position as indicated in Fig. 1 by the numeral 20. On the driveshaft 21, two bevel gears 22 and 23 are mounted in face-to-face and spaced relation and are in mesh with a right angle bevel pinion 24. Bevel gear 22 may be secured to shaft 21 by a key 25, while gear 23 is freely rotatable on bushing 26. When shaft 21 is rotated, bevel gear 22 will rotate in the same direction as crankshaft 21 and gear 23 will be forced to revolve at the same speed but in opposite direction thereto. Bevel gears 22 and 23 are equipped with annular pockets 27 and 28 for carrying counterweights $A_t$ and B, respectively. These counterweights may be fastened to the bevel gears in any desirable position by means of bolts 29 or the like in the annular pockets 27 and 28. With the crankpin 20 at top dead center, they are preferably located coincident at bottom dead center position as shown. Both counterweights may possess the same radius of rotation, but mass $A_t$ is shown considerably larger than mass B. According to previous explanations, the two counterrotating weights A and B in Figs. 23 to 26 should preferably be adapted to cause centrifugal forces of substantially the same magnitude, and hence, with identical radii of rotation, their masses should be equal. However, as also pointed out previously, the rotational inertia forces may be neutralized by a suitable counterweight or counterweights attached to the crankshaft diametrically opposite the crankpin. The additional mass required for off-setting the rotational inertia forces is therefore shown combined with the weight A of Figs. 23 to 26, resulting in the mass $A_t$ whose weight is such as to neutralize substantially one-half of the primary inertia forces plus the rotational inertia forces.

When equal centrifugal forces of necessary magnitudes are developed by masses $A_t$ and B, this balancing unit will counteract the primary inertia forces only, as pointed out above. Equal centrifugal forces will be produced when employing balancing masses of the same specific gravity, equal size, and identical radii of rotation; or by maintaining the relative sizes and equal radii of rotation of $A_t$ and B as shown in Fig. 1, but selecting for $A_t$ a material of lesser specific gravity than for B; or by reducing the radius of rotation of mass $A_t$ as compared with that of B by such means as will be described in connection with Figs. 4, 5, 6; or by a combination of some or all of these expedients.

Pinion 24 may be keyed to shaft 30 which is rotatably mounted in thrust bearing 31 and ball bearings 32 of bearing bracket 34 fast to bell-shaped casing 35 by means of bolts 33. Casing 35 may be conveniently provided with a front cover 36 secured thereto by bolts 39. To prevent leakage, seals 37 and 38 may be placed around the driveshaft 21. Housing 35 may have a flange 40 with bolt holes 41 for securing the balancing unit to a stationary part of the machine to be balanced.

Figure 4:
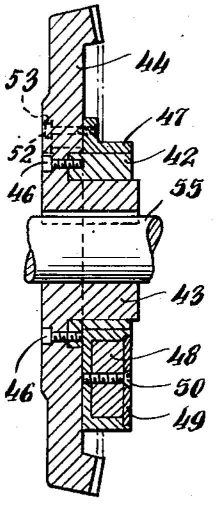
Fig. 4 shows a modification of the bevel gears exemplifying an eccentric mounting of the counterweighting masses in section along line 4—4 of Fig. 5.
Figure 5:
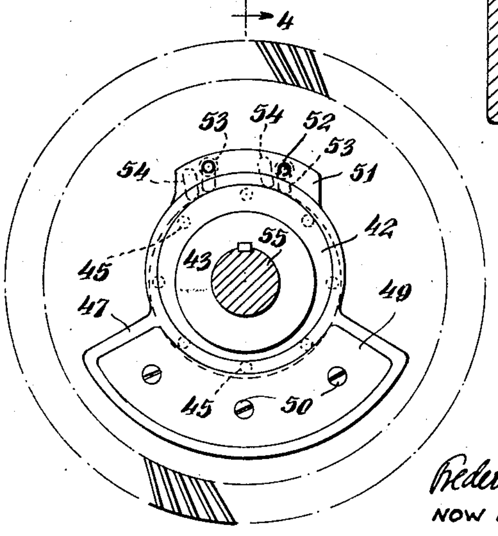
Fig. 5 is a right hand side view of the bevel gear shown in Fig. 4.
Figure 6:
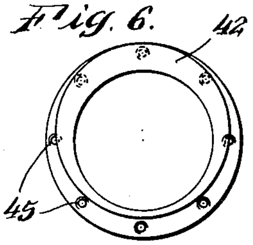
Fig. 6 shows in detail the eccentric bushing for carrying the counterweight.

Figs. 4 to 6 show a modification in the mounting of the counterweights which may be employed for any balancing unit. An eccentric sleeve 42 is adjustably mounted on the hub 43 of the bevel gear 44 and provided with a series of tapped bolt holes 45 whose centers are on a circle concentric with hub 43 for fastening the eccentric 42 in any desired angular position to the web of bevel gear 44 by means of bolts 46 extending through matching holes in the web of the bevel gear. Casing 47 is disposed on eccentric sleeve 42 and provided with a suitable pocket for receiving the counterweighting mass 48, which may consist of any heavy substance, such as lead, held in place by cover 49 and bolts 50. Casing 47 is equipped with a flange 51 having threaded holes adapted to receive bolts 52 extending through slots 53 in the web of bevel gear 44. Any number of additional suitably located slots as indicated by 54 may be arranged for the angular displacement of the counterweight.

Figs. 4 and 5 show the counterweight 48 in the position nearest the axis of rotation of shaft 55. By turning the eccentric sleeve 42, the radius of rotation of the counterweight may be increased, whereby the centrifugal counterbalancing force produced by the counterweight is increased accordingly. To compensate for this radial displacement, openings 53 and 54 are of slot shape.

The eccentric and angularly adjustable mounting of the counterweight 48 above described may be of special advantage when the balancing units are employed in conjunction with presses having adjustable strokes. The proposed changeability of the balancing effect also will facilitate the adaptation of one size balancing unit to a range of different machine sizes.

Figures 7, 8:
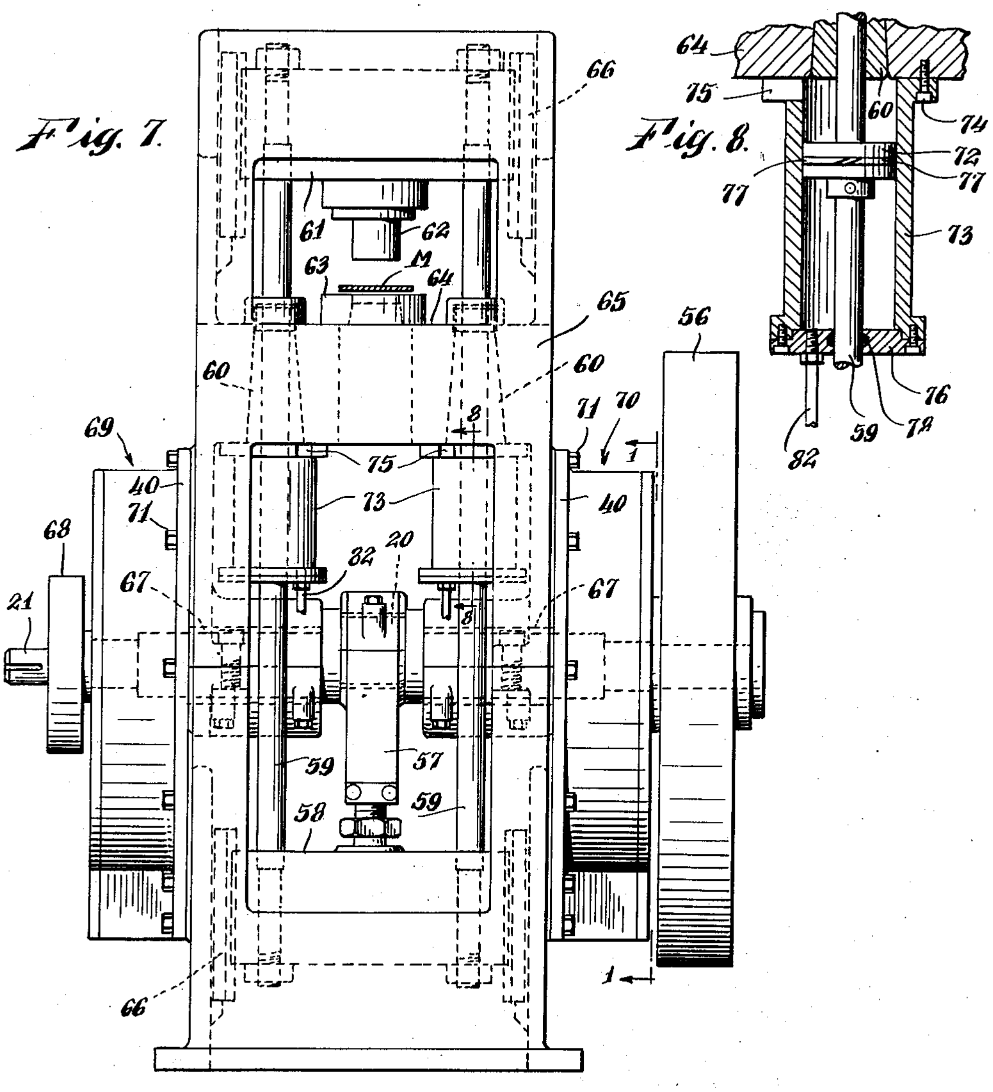
Fig. 7 depicts the application of balancing units shown in Figs. 1 to 3 to an underdrive punch press in combination with air cylinders located concentrically with the guide rods.
Fig. 8 is a cross-section of an air cylinder along line 8—8 of Fig. 7.

Fig. 7 exemplifies a possible application of the balancing unit of Figs. 1 to 3 to a punch press with underdrive. The press may be driven by belts from any power source such as an electric motor (not shown) on the clutch-flywheel 56 which is carried by crankshaft 21. A pitman or connecting rod 57 extends between crankpin 20 and lower cross-head 58 for reciprocating the latter. These presses are usually of square or rectangular form and four rods 59 of cylindrical cross-section, suitably guided in split tapered bushings 60, transmit the reciprocating motion of the lower cross-head 58 to the upper cross-head or slide 61 on which a punch 62 is fastened which cooperates with a die 63 normally supported on the bed or table 64 forming a part of the press frame 65. M indicates the work-material fed between punch and die either by hand or automatic feed (not shown) for performing thereon any desired operation such as blanking, stamping, drawing, embossing, etc. Upper and lower cross-heads 61 and 58 are shown adjustably guided on press frame 65 by means of gibbing, generally indicated by 66. Crankshaft 21 is journalled in bearings 67 and has attached to it a brake 68 for stopping the slide approximately in top dead center position of crankpin 20 when the flywheel 56 is declutched. This press or any other press shown and described hereinafter for exemplifying the application of the balancing means forms per se no part of the present invention.

Twin balancing units 69 and 70 may be flange-mounted to the outside of the press frame 65 (Fig. 7) by means of bolts 71. Each one of the guide rods 59 may carry a piston 72 pinned or otherwise fastened thereon and slidably guided in a cylinder 73 whose upper end is shown secured to the underside of table 64 by bolts 74 and has passages 75 communicating with the atmosphere (Fig. 8).

Figure 9:
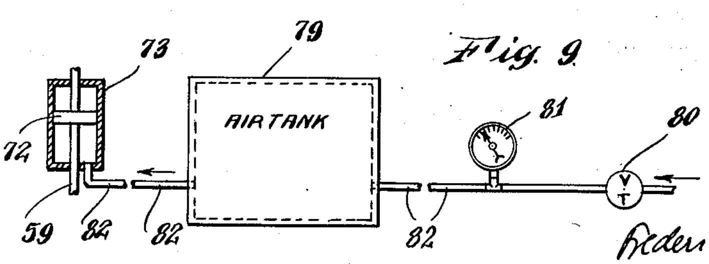
Fig. 9 shows diagrammatically the connection of the air cushion to an air tank.

A chamber is formed between piston 72 and lower cover 76 and sealed by packing or piston ring 77 and annular seal 78. As diagrammatically shown in Fig. 9, pressure fluid such as oil or preferably compressed air of sufficient pressure, from any suitable source not shown, is admitted to the chamber from a tank 79 to counterbalance the static weight of the reciprocating slide assembly, comprising the upper and lower cross-heads 61 and 58, guide rods 59, punch 62, etc. The pressure in tank 79 may be conveniently regulated by means of pressure regulating valve 80 and pressure gauge 81. Tank as well as control valve and gauge may be located wherever convenient, but it is pointed out that the cylinders 73 are in direct communication with tank 79 by conduits 82. As tank 79 is of comparatively large volume, the air pressure in cylinders 73 will remain substantially constant at all times.

All four guide rods 59 may be arranged with concentric air cushions 73 as shown, or only two diagonally opposite guide rods may be so arranged, depending on the size air cylinders employed, the available maximum air pressure, and the weight of the reciprocating slide assembly. The novel mounting of the air cylinders 73 underneath the press table 64 and concentric with the guide rods 59 results in advantageous space utilization and simplified construction.

For certain punch press operations, it may be desirable to overbalance the static weight for the purpose of taking up any existing play in the bearings and other operating elements of the machine to control the penetration of the punch more closely. While the air cylinders shown may be conveniently employed for this purpose also, this is a consideration which is not part of the balancing problem.

The masses of the counterweighting means in balancing units 69 and 70 are preferably so chosen that each one of the balancing units neutralizes substantially one-half of the total existing rotational and primary inertia forces. The counterbalancing of the static weight may also be evenly distributed among the total number of air cylinders employed. It will be noted, however, that the secondary inertia forces remain unbalanced. This degree of counterbalance is frequently sufficient for practical purposes. This depends, of course, mainly on the maximum operating speed demanded and balancing units adapted to also neutralize the secondary inertia forces will be shown and described hereinafter.

This type balancing device is capable, however, of completely counterbalancing the inertia forces of the reciprocating slide assembly of a press which employs a sliding block surrounding the crankpin instead of a pitman of finite length.

Figures 10, 11, 12, 13, 14:
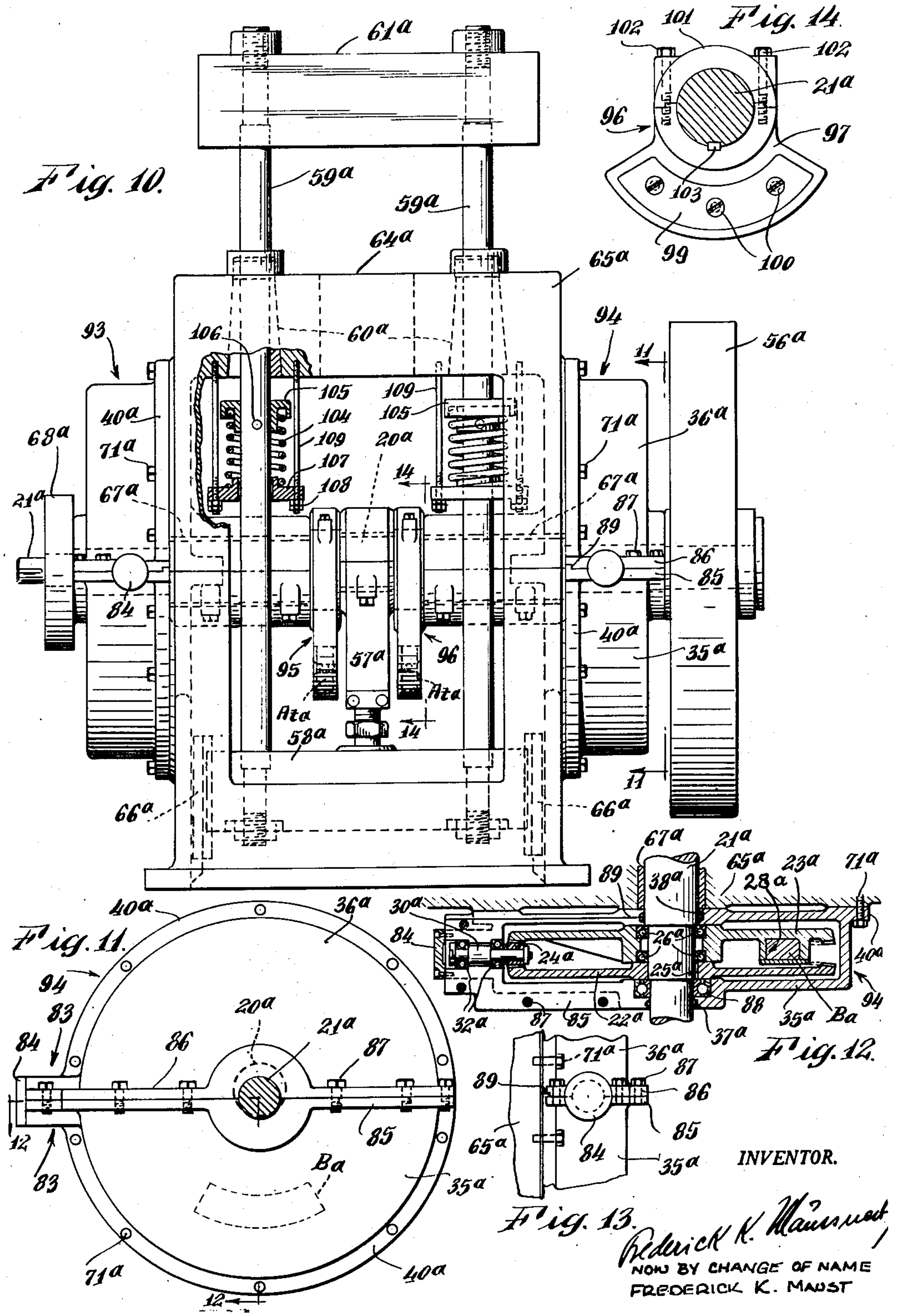
Fig. 10 shows an underdrive punch press with twin balancing units and separate counterweights on the cheeks of the crankshaft together with springs arranged concentrically with the guide rods for off-setting the static weight.
Fig. 11 illustrates a right hand side view of the balancing unit employed in Fig. 10 as seen along line 11—11 of Fig. 10, press frame and mounting bolts not shown.
Fig. 12 is a cross-sectional view along line 12—12 of Fig. 11.
Fig. 13 shows a partial left hand side view of the balancing unit illustrated in Figs. 11 and 12.
Fig. 14 depicts one of the counterweights on the cheeks of the crankshaft along line 14—14 of Fig. 10.

Figs. 10 to 13 illustrate a somewhat simpler balancing unit and its application to an underdrive punch press, similar to that shown and described in conjunction with Fig. 7. To simplify the description, similar elements have received identical numerals as before with the letter "*a*" attached for differentiation. One difference between the designs of the presses shown in Figs. 7 and 10 is that the upper cross-head 61*a* of Fig. 10 is not guided on the press frame 65*a*.

It will be seen that only the counterweighting mass B*a* is incorporated in the balancing unit proper. This mass B*a* is rotated in opposite direction to and at the same speed as the crankshaft 21*a* for off-setting one-half of the primary inertia forces. Other counterweights 95 and 96 are attached directly to the crankshaft 21*a* for neutralizing the rotational inertia forces and the remaining one-half of the primary inertia forces.

In Figs. 11 to 13 the bevel gears 22*a* and 23*a* are geared together by pinion 24*a* as before. Bevel gear 22*a* is again keyed to driveshaft 21*a* but carries no counterweight. Bevel gear 23*a* is freely rotatable on driveshaft 21a in ball bearings 26a and is equipped with a pocket 28a for carrying mass Ba. Pinion 24a is keyed to shaft 30a and free to rotate in radial thrust bearings 32a which are mounted in suitable bores of projections 83 formed on one side of the horizontally split housings 35a and 36a. A cover 84 serves to seal the opening in the casing. Lower and upper casing halves 35a and 36a carry flanges 85 and 86 along the horizontal split line and are secured tightly together by a series of bolts 87. The rear parting line of the casing halves 35a and 36a may be formed in the shape of an interlocking shoulder 89, and both said halves may be provided with circumferential mounting flanges 40a for securing the balancing unit to the machine frame 65a by means of bolts 71a, as shown in Fig. 10 for balancing units 93 and 94.

The auxiliary counterweights 95 and 96 may be mounted on the crankshaft 21a at any convenient location but are shown attached to the cheeks of the crankshaft adjacent to the crankpin 20a. One of the counterweights is shown in detail in Fig. 14 and may consist of a lower half 97 forming a pocket for carrying mass $A_{ta}$ which is held in place by a cover 99 and screws 100. The counterweighting means are clamped to the crankshaft by means of bearing cap 101, bolts 102; a key 103 may be provided for positive location with respect to the crankpin 20a.

The masses $A_{ta}$ and their radii of rotation are preferably so chosen that their combined centrifugal forces oppose and neutralize the total rotational and substantially one-half of the primary inertia forces. These two counterweights 95 and 96 correspond therefore in their balancing effect and function to the weight $A_t$ in the balancing unit of Figs. 1 to 3; counterweight Ba is directly comparable to mass B of Figs. 1 to 3.

The counterbalancing of the static weight of the reciprocating slide assembly is shown to be effected by coiled compression springs 104 placed concentrically with guide rods 59a and acting against spring seats 105 secured to rods 59a by pins 106. The other ends of the springs rest on seats 107 which are vertically adjustable for preloading purposes by means of threaded nuts 108 and rods 109 are shown.

A similar balancing effect could, of course, be obtained by choosing the masses $A_{ta}$ on the cheeks of the crankshaft of sufficient magnitude, only to off-set the rotational inertia forces. Then balancing units of the type shown in Figs. 1 to 3 would be required but with masses $A_t$ and B for developing centrifugal balancing forces of substantially equal magnitude by employing such expedients as pointed out in connection with Figs. 1 to 3. The balancing units would then neutralize the primary inertia forces and the auxiliary weights on the crankshaft would off-set the rotational inertia forces. The counterweighting masses rotating in crankshaft direction within the balancing units and the counterweights directly attached to the crankshaft (95, 96) may also be proportioned in any other desirable manner as long as the total centrifugal counterbalancing forces of all the counterweights revolving at crankshaft speed and in crankshaft direction are substantially equal and opposite to the rotational inertia forces and to one-half of the primary inertia forces.

Space is consumed for swinging the counterweights 95 and 96 on the crankshaft cheeks. For certain forming and drawing operations, air cushions or spring attachments must be placed underneath the press table 64a, for which reason the balancing system shown in Fig. 7 is generally preferred.

Figure 16:
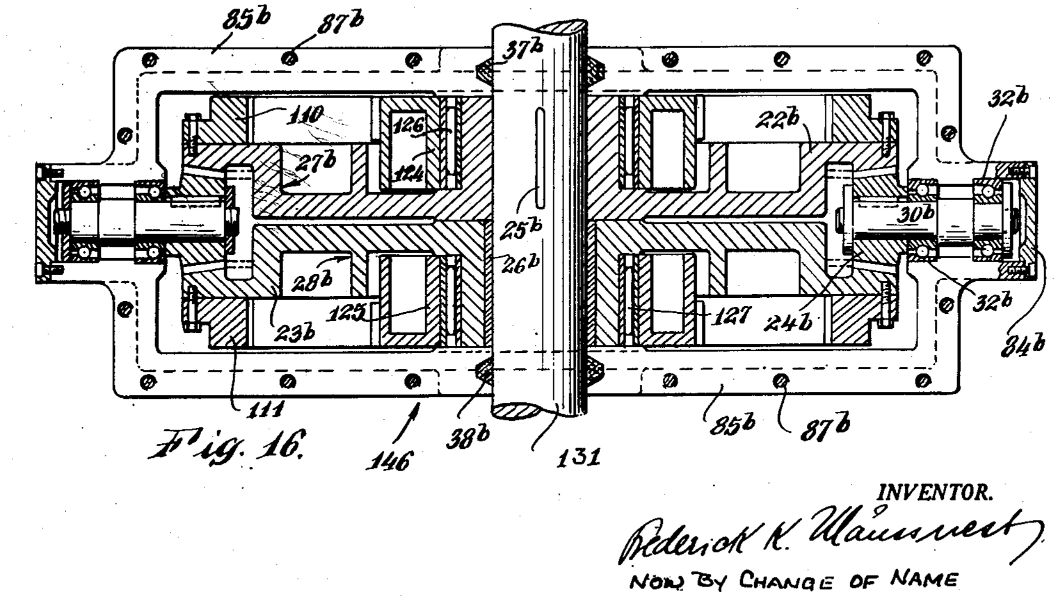
Fig. 16 is a horizontal cross-section through the same unit along line 16—16 of Fig. 18.

Figs. 15 and 16 exemplify a balancing unit 146 adapted to neutralize primary and secondary inertia forces as well as the rotational inertia forces. Therefore, in addition to the balancing masses $A_{tb}$ and Bb rotating in respective opposite directions at the frequency of the first harmonic, i. e. at crankshaft speed, other balancing weights C and D are provided to rotate at the frequency of the second harmonic, or at twice crankshaft speed. Balancing unit 146 is shown split along the horizontal center line as previously shown in Figs. 11 to 13, with the exception, however, that two bevel pinions 24b are employed to distribute the load. Both bevel gears 22b and 23b are equipped with annular pockets for receiving the counterweights $A_{tb}$ and Bb in a similar manner as shown and described in connection with Figs. 1 to 3. To simplify the description, similar elements have therefore received the same numerals as in the preceding illustrations with the letter "b" attached for differentiation.

The two counterrotating bevel gears 22b and 23b carry internal gear rings 110 and 111 which mesh with pinions 112 and 113, respectively. Stub shafts 114 and 115 fast in suitable bosses 116 and 117 and secured by washers 118 and 119 and bolts 120 and 121 revolvably carry said pinions 112 and 113 on suitable bearings, such as needle bearings 122 and 123, respectively. Pinions 112 and 113 are in turn in mesh with gears 124 and 125, respectively, which are freely rotatable in bearings 126, 127 on the hubs of bevel gears 22b, 23b. Gears 124 and 125 may form annular pockets for carrying the counterweights D and C in a similar manner as previously described in connection with the counterweights $A_{tb}$ and Bb. The several counterweights of Fig. 15 are shown to be enclosed in containers aas indicated at 128 with a cover 129 and bolts 130 threaded into the web of the gears for conveniently locating said counterweights. Should it be desirable to displace the counterweights in the annular pockets, additional holes may be drilled and tapped for said bolts 130.

Assuming that the crankshaft 131 rotates in counterclockwise direction as viewed from the right in Fig. 15, bevel gear 22b, internal gear ring 110 and pinion 112 will also rotate in counterclockwise directions, while gear 124 with counterweight D will revolve in clockwise direction. Bevel gear 23b, gear ring 111, pinion 113 will rotate in clockwise directions and gear 125 with counterweight C in counterclockwise direction. The numbers of teeth in respective gear rings 110, 111, pinions 112, 113, and gears 124, 125 are so selected that gears 124, 125 are caused to rotate at twice crankshaft speed. Thus the directions and speeds of rotation of all counterweights diagrammatically shown in Figs. 23 to 26 have been realized in practice.

Figure 17:
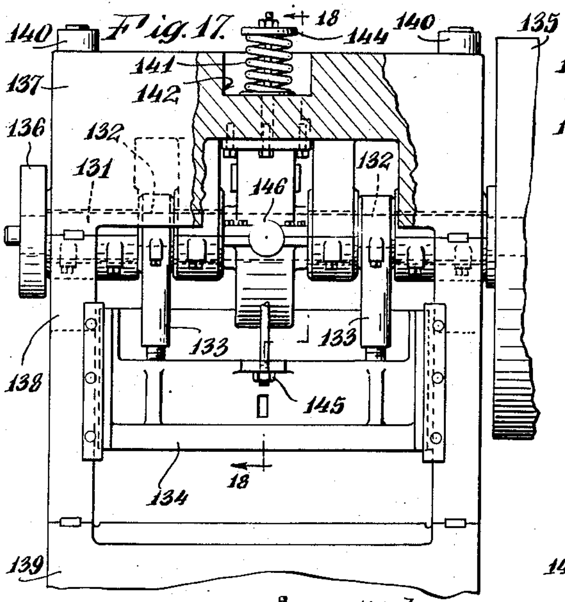
Fig. 17 shows a double crank press with centrally located balancing unit, partly in section along line 17—17 of Fig. 18.
Figure 18:
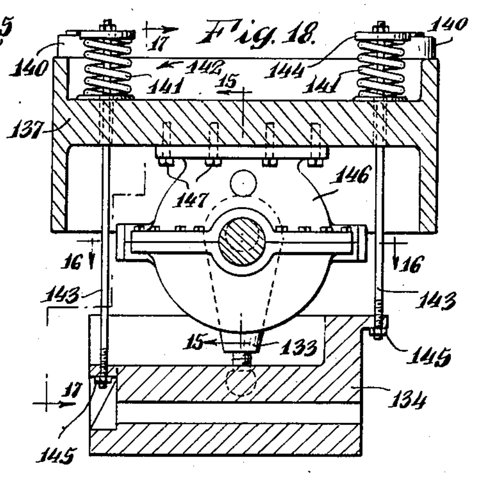
Fig. 18 is a fragmentary section alone line 18—18 of Fig. 17 depicting the crown and slide of the press.

Figs. 17 and 18 show a straight sided double crank press of tie-rod construction with a centrally disposed single balancing unit 146 of the type shown in Figs. 15 and 16. This press is called "double crank" press in the trade, because the driveshaft or crankshaft 131 is equipped with two crankarms or crankpins 132 and two pitmans 133 for reciprocating the slide 134. The clutch-flywheel 135 is mounted on one end of the crankshaft and a brake 136 on the opposite end. The crown 137, housings 138, and bed 139 are usually tied together by four tie-rods and nuts 140. The static weight of the slide assembly including the weight of any bolster plate, die etc. which may be secured thereon (not shown) is counterbalanced by means of coiled compression springs 141 located in a chamber 142 formed in crown 137. Rods 143 extend between spring seats 144 and slide 134 and are adapted for varying the preloading of springs 141 by means of nuts 145. A series of bolts 147 secure the balancing unit 146 to crown 137.

Figure 19:
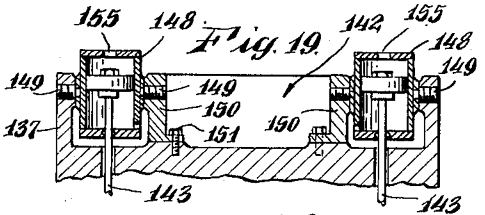
Fig. 19 shows a fragmentary section of the crown of the press shown in Fig. 18, exemplifying the use of air cushions instead of springs.

Fig. 19 illustrates the application of pivotally mounted air cushions or air cylinders 148 (instead of springs 141) to the press of Figs. 17 and 18. The basic arrangement is identical to that described in conjunction with Figs. 8 and 9 and needs no explanations. The air cylinders 148 are free to turn on pivots 149 supported in the wall of crown 137 and in the brackets 150 bolted to the crown as indicated at 151. The top of the air cylinders is open to the atmosphere through apertures 155.

Figure 20:
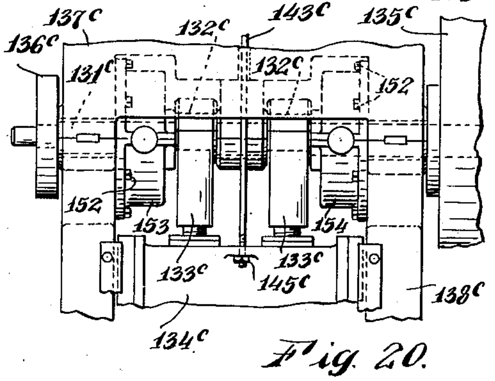
Fig. 20 illustrates the application of twin balancing units inside the press frame of a double crank press of which only a fragmentary front elevation is shown.

Fig. 20 shows the application of twin balancing units 153 and 154 to a similar double crank press as shown in Figs. 17, 18. These balancing units are secured to the inside of the press frame by means of bolts 152. Depending on the degree of counterbalancing required, the units may be of the type shown in Figs. 1 to 3 or Figs. 15 and 16.

The static weight of the slide may be counterbalanced by means of air cushions according to Fig. 19 or by springs as shown in Figs. 17 and 18. Similar parts have received the same numerals as in Figs. 17 and 18 with the letter "c" attached.

Figure 21:
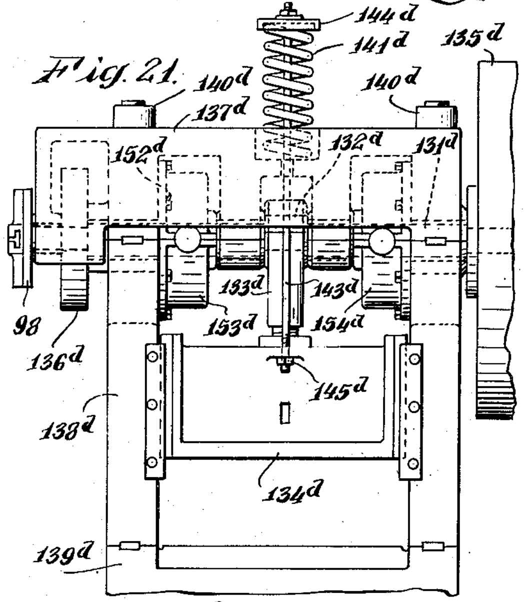
Fig. 21 shows a partial front view of a single crank press with twin balancing units mounted inside the press frame.

Fig. 21 exemplifies the provision of twin balancing units to the inside of the press frame of a single crank punch press and corresponds directly to Fig. 20. Similar elements have received identical numerals with the letter "d" attached. The crankshaft 131d carries at its left end an adjustable crank disc 98 which is frequently employed for actuating an automatic feed, such as a roll feed (not shown) for feeding the work material intermittently between punch and die.

Fig. 22 shows a single crank press provided with twin balancing units 90 and 91 on the outside of the press frame. The units are of the type illustrated in Figs. 1 to 3 and secured to the press frame by means of bolts 71e. The static weight of the slide assembly of this or any of the other presses shown may be counterbalanced by means of springs or air cushions as previously described. Similar elements as shown before have again received the same numerals with the letter "e" attached to simplify the description.

Likely locations for mounting the balancing means have been shown in conjunction with several popular press types. It is expressly understood, however, that these locations were selected as examples only. The balancing means should be located where most convenient and effective in any one of the multitude of particular press designs known in the art.

For instance, the balancing units 153 and 154 of Fig. 20 could be located on the outside of the press frame as shown in Fig. 22; or two additional balancing units, besides units 153 and 154, may be provided on the outside of the press frame, thereby dividing the balancing task among four units. In addition to the centrally located balancing apparatus 146 in Fig. 17, two more balancing units may be applied to the inside of the press frame as shown in Fig. 20, and/or two additional units may be provided on the outside of the press frame as shown in Fig. 22, or any desired combination thereof may be employed. When multiple balancing units are used, they are preferably, but not necessarily, located symmetrically to the crank and each one may contribute equally to neutralize the total existing unbalanced inertia forces. The use of multiple units obviously permits a decrease in size for each unit.

While the counterweight or counterweights for offsetting the rotational inertia forces may be advantageously combined with the balancing mass in the unit which rotates in the same direction and at the same speed as the crankshaft, this is not essential as exemplified in Fig. 10. Underdrive punch presses may have their balancing devices located inside the press frame synonymous to Figs. 17, 18, 20, and 21 instead of on the outside as illustrated in Figs. 7 and 10.

The actuation of the counterrotating balancing weights at crankshaft speed by means of bevel gear trains results in a most compact design and destroys the harmful inertia forces directly on the crankshaft on which they are acting, thus assuring smooth and vibrationless operation of the machine at high speeds, reducing bearing pressures and prolonging bearing life. The bevel gears may be of the straight, spiral, skew, hypoid or other suitable type. The gearing for imparting twice crankshaft speed to those balancing masses which offset the secondary inertia forces may have spur, helical or herringbone type teeth. Other driving means may be employed for the several counterweights, such as belts or ordinary gearing throughout, or a combination of both.

Regarding compactness of design, reference is made to Figs. 1 to 3 in which the counterrotating weights $A_t$ and B are placed between the bevel gears, thus utilizing the space required by the bevel pinion; or to Figs. 15 and 16, where compactness is achieved in a similar, if slightly different, manner and where the respective orbits of the primary and secondary counterweights $A_{tb}$, $Bb$ and D, C, respectively, are so chosen as to nest them.

Any one of the balancing units shown and described, or any combination thereof, may be substituted for the specific units applied in conjunction with Figs. 7, 10, 17, 18, 20, 21, and 22 to obtain either complete neutralization of all rotational, primary and secondary inertia forces or any lesser degree of counterbalance desired.

Many modifications will be obvious to those skilled in this art. With the several examples shown, only ordinary skill will be required to apply the teachings of this invention to any crank actuated reciprocating mechanism or kinematically equivalent system. Balancing units producing different degrees of counterbalance may be obtained by stripping the complete balancing unit of Figs. 15 and 16 successively of one balancing element after another, until the simplest arrangement is left as shown in Figs. 11 to 13, namely, one counterweight $Ba$ rotating in opposite direction to, but at the same speed as, the crankshaft.

I have described the principles of my invention, together with practical means for attaining the objects thereof, but I desire to have it understood that the balancing devices shown are only illustrative and that the invention may be carried out by other means, and applied to uses other than above set out. It will also be understood that all of the features of the invention need not be used conjointly as they may be used to advantage in various combinations as defined by the appended claims.

I claim:

1. Balancing means for mechanisms having a driveshaft including eccentric or crank means as well as connecting rod means for reciprocating a slide comprising at least one pair of balancing masses, means for rotating said masses in respective opposite directions around said driveshaft at the frequency of the first harmonic, the mass rotating in driveshaft direction being of such magnitude and having a radius of rotation as to produce centrifugal forces adapted to oppose and neutralize the rotational inertia forces and substantially one-half of the primary inertia forces, the mass rotating in opposite direction thereto being of such magnitude and having a radius of rotation as to oppose and neutralize the remaining one-half of the primary inertia forces, auxiliary balancing masses, gearing means associated with said auxiliary masses and operatively connected with said rotating means for imparting to said auxiliary masses a rotational speed around the driveshaft equal to the frequency of the second harmonic to oppose and neutralize the secondary inertia forces.

2. A balancing apparatus of the character described comprising a pair of bevel gears disposed on the crankshaft of a machine to be counterbalanced, a counterweighting mass associated with each of said bevel gears, means for rotating said bevel gears with their associated counterweighting masses in respective opposite directions at the speed of the crankshaft, said counterrotating masses being adapted to create centrifugal counterbalancing forces of substantially equal magnitude and such respective directions as to oppose and neutralize the primary inertia forces, other counterweighting masses located diametrically opposite the crank of the crankshaft and adapted to be rotated with the latter and to neutralize the rotational inertia forces, an internal gear ring secured to each of said bevel gears, a gear freely rotatable on the respective hubs of each of said bevel gears, a pinion meshing with each of said associated internal gear rings and gears adapted to rotate said gears at twice crankshaft speed, and a counterweight secured to each of said gears for counterbalancing the secondary inertia forces, said counterweighting masses and counterweights being coincident at bottom dead center when the crankshaft is at top dead center.

3. A counterbalancing device for a punch press having a frame, a slide, a driveshaft including eccentric means for reciprocating said slide, comprising a housing secured to said frame, at least two balancing weights inclosed in said housing, the first of said balancing weights being constructed to neutralize one-half of the unbalanced primary inertia forces as well as the rotational inertia forces, the second of said balancing weights being constructed to neutralize the remaining one-half of the unbalanced primary inertia forces; a first bevel gear, means for securing said first balancing weight to said first bevel gear in a radially displaced position with respect to said driveshaft for counteracting the rotational inertia forces plus one-half of the primary inertia forces, a second bevel gear, means for securing said second balancing weight to said second bevel gear in a radially displaced position with respect to said drive shaft for counteracting the remaining one-half of the primary inertia forces, both said bevel gears being located within said housing in face-to-face and spaced relation and disposed coaxially with said driveshaft; an idler pinion meshing with both said bevel gears, and means for fastening said first bevel gear to said driveshaft to rotate said bevel gears with their respective balancing weights in opposite directions but in synchronism with said driveshaft.

4. A counterbalancing device according to claim 3, including an internal gear ring secured to each of said bevel gears, a gear freely rotatable on the respective hubs of each of said bevel gears, a pinion meshing with each of said cooperating internal gear rings and gears for rotating said gears at twice driveshaft speed, an auxiliary balancing weight secured to each of said gears for counterbalancing the secondary inertia forces, said balancing weights being coincident at bottom dead center when the driveshaft is at top dead center.

FREDERICK K. MAUSSNEST.

REFERENCES CITED

The following references are of record in the file of this patent:

UNITED STATES PATENTS

| Number | Name | Date |
|---|---|---|
| 1,226,832 | Webber | May 22, 1917 |
| 2,127,317 | Welch | Aug. 16, 1938 |
| 2,182,988 | Iseler | Dec. 12, 1939 |
| 2,183,467 | Sarazin | Dec. 12, 1939 |
| 2,188,482 | Parks | Jan. 30, 1940 |
| 2,244,428 | O'Leary | June 3, 1941 |
| 2,248,182 | Mateer | July 8, 1941 |
| 2,284,515 | Criswell | May 26, 1942 |
| 2,293,915 | Patterson | Aug. 25, 1942 |
| 2,366,033 | Johnstone | Dec. 26, 1944 |
| 2,428,924 | Albertson | Oct. 14, 1947 |